United States Patent Office 3,730,929
Patented May 1, 1973

---

3,730,929
BLOOM INHIBITED FLAME RETARDANT COMPOSITIONS
Michael Joseph Breza, Trenton, N.J., assignor to Cities Service Company, New York, N.Y.
No Drawing. Filed Apr. 30, 1971, Ser. No. 139,256
Int. Cl. C08f 45/58
U.S. Cl. 260—23 H                                           10 Claims

ABSTRACT OF THE DISCLOSURE

Compositions are disclosed which comprise a thermoplastic polyolefin polymer, an organohalide fire retarding agent, and a saturated fatty acid or metal salt of a saturated fatty acid as a bloom inhibitor. Such compositions also preferably include a metal compound synergist such as antimony oxide.

---

This invention relates to flame retarded thermoplastic polyolefin polymers. More specifically, it relates to flame retarded thermoplastic polyolefin polymers, such as polyethylene or polypropylene, which contain an organohalide compound as the fire retarding agent and a saturated fatty acid or a metal salt of a saturated fatty acid as a bloom inhibitor.

It is known to render thermoplastic polyolefin polymers flame resistant or flame retardant by the inclusion of various organohalide compounds, several of which are disclosed in United States Pats. 3,385,819; 3,456,022; 3,527,722; 3,530,083; 3,530,090 and 3,530,164. One problem which may be experienced with the use of organohalide compounds as fire retarding agents in thermoplastics, particularly those which contain bromine, is "bloom"; i.e. the fire retarding agent migrates through the polymer and forms an exudate on the polymer surface. This causes a dulling of the surface, with a reduction in gloss, thereby ruining the aesthetics of a plastic article, especially when colored. The resulting exudate also attracts dirt and moisture, which can be more than aesthetically objectionable, e.g. electrical properties can be detrimentally affected when the polymer is used as insulation for switches, wires, cables, and the like. Another objectionable consequence of bloom is the eventual loss of the fire retarding agent from the polymer to the extent that it is no longer adequately fire retardant, and such loss in flame retardancy is even further aggravated when the composition is subjected to repeated flexing or wearing actions which cause the flame retarding agent to be separated from the polymer surface, e.g. when the composition is a carpet tufting made of polypropylene fiber.

SUMMARY OF THE INVENTION

It has now been discovered that saturated fatty acids and metal salts of saturated fatty acids are effective bloom inhibitors in a thermoplastic polyolefin polymer which has been rendered flame retardant by means of an organohalide fire retarding agent.

Broadly, this invention is thermoplastic polyolefin polymers which contain an effective amount of an organohalide fire retarding agent and a bloom inhibitor selected from saturated fatty acids and metal salts of saturated fatty acids. A metal compound synergist is also preferably included.

DESCRIPTION OF THE INVENTION

Any suitable saturated fatty acid or metal salt of a saturated fatty acid can be employed in the compositions of this invention, but acids or salts having at least 6 carbon atoms in the molecule are preferred. More preferably, the acids or salts may have from about 12 to about 22 carbon atoms in the molecule. Advantageous results can, for instance, be obtained through the use of stearic acid or stearates as bloom inhibitors. Suitable saturated fatty acid salts include salts of calcium, tin, aluminum and zinc. Stannous stearate or aluminum stearate can be employed to particular advantage.

The amount of saturated fatty acid or saturated fatty acid salt which should be incorporated into the fire retardant thermoplastic polymer is subject to considerable variation depending upon the particular acid or salt employed, the type of polyolefin polymer into which it is incorprated, and the type and amount of fire retarding agent employed. Generally, an amount of saturated fatty acid, or a salt thereof, which is within the range of about 0.1 to about 5 percent of the total weight of the composition will inhibit bloom but greater or lesser amounts can be employed where indicated, and an optimum amount of a specific saturated fatty acid, or salt thereof, can be determined from simple experiments suggested by the teachings of this disclosure and which are guided by the good judgment of one skilled in the art.

As previously indicated, the purpose of the saturated fatty acid or salt is to inhibit bloom, i.e. exudation of the fire retarding agent from the thermoplastic polymer. Desirably, therefore, the inhibitor should be intimately mixed with the polymer and the fire retarding agent. This can be accomplished by conventional mixing techniques, e.g. in an extrude, a Banbury, or on a roll mill. Other ingredients can also be mixed with the polymer, conveniently at the same time that the saturated fatty acid or salt is mixed therewith, including the fire retarding agent; and, when preferred, other additives such as a metal compound synergist, a pigment, a plasticizer, a stabilizer, or other preferred materials.

The invention is not limited to use of a particular type of fire retarding agent since the bloom inhibitors claimed are effective with more than one type of halogenated agent. Among those which can be employed are a variety of well-known organohalide fire retarding agents which have the formula R(X)a where R represents a cyclic or acyclic olefin having from about 4 to about 24 carbon atoms, X is chlorine or bromine, and "a" is an integer in the range of about 1 to about 14. Exemplary compounds of this general type include tetrabromo derivatives of 4-vinylcyclohexane, tetrabromocyclooctane, perhalocyclodecanes, such as hexachlorocyclopentadiene dimer, compounds having the structure of a Diels-Alder adduct of a halogenated cyclopentadiene and an unsaturated aliphatic halide, compounds having the structure of a Diels-Alder diadduct of a halogenated cyclopentadiene and an unsaturated aliphatic or cycloaliphatic compound, brominated derivatives of bis(cyclohexenyl)ethylene, tetrabromocyclononanes, and tetrabromo derivatives of 1,7-octadienes. Especially preferred fire retarding agents are brominated derivatives of bis(cyclohexenyl)ethylene and compounds having the structure of a 1:1 Diels-Alder adduct of hexachlorocyclopentadiene and an unsaturated aliphatic or cycloaliphatic bromide. Preferred 1:1 Diels-Alder adducts of the just-mentioned type are compounds of the structure

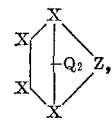

wherein X and Q are chlorine, Z contains a single 8 member ring and 2 bromine atoms. However, other preferred fire retarding agents of this general type are compounds wherein X is chlorine or bromine, Q is a halogen, hydrogen, hydrocarbyl, or hydrocarboxy group, Z is a divalent hydrocarbyl polybromide having from about 5 to about 16 carbon atoms and from about 2 to about 6 bromine atoms, and wherein the valences are on adjacent carbon atoms and the bromine atoms are substituents on aliphatic or cycloaliphatic carbon atoms. In such cases Z can be a polybromocycloalkylene group, and will preferably contain from 8 to 12 carbon atoms in a single carbocyclic ring and 2 to 4 bromine atoms.

The amount of fire retarding agent which can be employed in the present invention is subject, of course, to wide variation depending upon the type employed, the amount of metal compound synergist such as antimony oxide, if employed, and the degree of flame retardancy sought. Generally, the compositions of this invention will contain about 1 to about 60 weight percent of the fire retarding agent, but greater and lesser amounts can be utilized when it is preferable and practical to do so. It is frequently preferable to minimize the content of additives to the polyolefin polymer in the interest of preserving the physical properties of the pure polymer such as tensile strength, elongation, modulus, color and gloss. Using flame retardants which have been previously referred to herein as especially preferred, nonburnable thermoplastic polyolefin polymers can be provided wherein the weight content of the flame retarding agent does not exceed about 30 weight percent, and nonburnable polypropylene may be produced with as little as about 1 weight percent, or less, to about 10 weight percent of these materials.

It has been observerd, however, that the tendency to bloom increases as the content of fire retarding agent and metal compound synergist in the composition is reduced, e.g. to a content below 15 weight percent. Bloom can, therefore, be more pronounced when the content of fire retarding additives has been optimized to provide a preselected degree of flame retardancy at the lowest possible loading of the fire retarding agent. While the present invention is directed toward alleviation of this particular problem, it will nonetheless be understood that it is not specifically limited to polyolefin compositions having a low content of fire retarding agent.

As previously indicated, a metal compound synergist is preferably employed in the present compositions for reducing the content of fire retarding agent required therein for achieving a preselected degree of flame retardancy. Well known compounds of antimony, arsenic, and bismuth can be employed for this purpose. Antimony oxide is a preferred synergist.

If the fire retarding agent is unstable at temperatures at which the compositions of this invention are normally processed or used, a stabilizer can also be incorporated in the polymer. Certain organotin compounds can be employed as the stabilizer, one example being dibutyl tin bis (isooctyl maleate). Usually only small amounts of this compound, e.g. from about 0.01 to about 3.0 weight percent of the composition, are required to achieve a substantial improvement in the thermal stability of the fire retarding agent.

EXAMPLE 1

A brominated 1:1 Diels-Alder adduct of polychlorocyclopentadiene and cyclooctadiene-1,5- was prepared as follows:

In a flask, fitted with a stirrer, a thermometer and a reflex condenser was placed 259.6 g. (2.4 moles) cycloocta-diene-1,5 and 81.8 g. (0.3 mole) hexachlorocyclopentadiene. The mixture was heated in twenty minutes to 140° C. and maintained at this temperature for two hours, with stirring. The mixture was then distilled at reduced pressure (100 mm.) to remove the unreacted cyclooctadiene. Near the end of the distillation, with the pot temperature at 100° C., pressure was reduced to 50 mm. and then to 25 mm., at which time the pot temperature was increased to 160° C. Vacuum distillation was continued under these conditions for eight hours to remove substantially all the volatiles.

At this time, the more volatile 1:1 adduct was separated from the mixture of 1:1 and 2:1 adducts by reducing the pressure to about 0.5 mm. Hg. The 1:1 adduct was removed at an overhead temperature of 138° C.–155° C.

Into a flask fitted with a thermometer, a stirrer and two dropping funnels was placed 100 ml. t-butyl alcohol. A heptane solution (133 ml.) containing 76.2 g. (0.2 mole) of the 1:1 adduct of hexachlorocyclopentadiene and cyclooctadiene was added simultaneously with 32.8 g. (0.205 mole) bromine over a period of one-half hour. The addition rates were adjusted so that an excess of bromine, noted by the persistence of a characteristic red-brown color, was maintained during the reaction. The reaction temperature was kept at 25° C. After completion of the reaction, stirring was continued for one-quarter hour, followed by the addition of 2.0 g. sodium carbonate, to neutralize excess bromine. After stirring an additional one-half hour, the mixture was filtered, with the resultant filter cake being washed with three separate 150 ml. portions of water and three separate 50 ml. portions of isopropyl alcohol. The cake was vacuum dried at 50° C., yielding 80.7 g. (74.6% yield) of brominated adduct having a melting range 190°–193° C. Recrystallization from chloroform gave a product (5,6-dibromo-1,10,11,12,13,13-hexachlortricyclo[8,2,1,0$^{2,9}$]tridec-11-ene) with a melting range 201–3° C.

EXAMPLES 2–14

The brominated 1:1 Diels-Alder adduct prepared in Example 1 and the hexabromide of 1,2-bis(3-cyclo-hexenyl)ethylene were incorporated into polypropylene as fire retarding agents while employing stearic acid and stearates as bloom inhibitors. Antimony trioxide was employed as a synergist. For testing purposes each composition was compression molded into bars. The amount of each additive is shown in Table I. The length of time till bloom appeared, or failed to appear, is also shown in the table.

TABLE I

| Example | Parts by weight of— | | | | | | | | | | | | |
|---|---|---|---|---|---|---|---|---|---|---|---|---|---|
| | 2 | 3 | 4 | 5 | 6 | 7 | 8 | 9 | 10 | 11 | 12 | 13 | 14 |
| Polypropylene | 84.0 | 91.5 | 84.0 | 83.0 | 82.0 | 91.5 | 84.0 | 91.5 | 91.5 | 91.5 | 93.13 | 93.13 | 93.13 |
| Brominated 1:1 adduct, Example 1 | 10.5 | 5.25 | 10.5 | 10.4 | 10.25 | 5.25 | 10.5 | 5.2 | 5.25 | 5.25 | 0 | 0 | 0 |
| Hexabromide of 1,2-bis (3-cyclo-hexenyl) ethylene | 0 | 0 | 0 | 0 | 0 | 0 | 0 | 0 | 0 | 0 | 4.15 | 4.15 | 4.15 |
| Sb$_2$O$_3$ | 5.2 | 2.6 | 5.2 | 5.2 | 5.1 | 2.6 | 5.2 | 2.6 | 2.6 | 2.6 | 2.07 | 2.07 | 2.07 |
| Aluminum stearate | 0 | 0 | 0.5 | 1.3 | 2.55 | 0.65 | 0 | 0 | 0 | 0 | 0 | 0 | 0 |
| Zinc stearate | 0 | 0 | 0 | 0 | 0 | 0 | 0.5 | 0.5 | 0 | 0 | 0 | 0 | 0 |
| Stearic acid | 0 | 0 | 0 | 0 | 0 | 0 | 0 | 0 | 1.0 | 0.5 | 0 | 0.65 | 1.0 |
| Days til bloom appeared | <1 | <1 | | | | | | | 29 | | 29 | <1 | 14 | |
| Days after which no bloom was apparent | | | 133 | 133 | 133 | 33 | 29 | | 30 | | | | 03 |

The effectiveness of saturated acids and metal salts of saturated fatty acids as bloom inhibitors for organohalide fire retarding agents in thermoplastic polyolefin polymers has been demonstrated in the preceding examples. While the invention has been described with reference to particular materials, proportions, procedures, and the like, it will nonetheless be understood that other embodiments will become apparent which are within the spirit and scope of the invention that is defined in the appended claims.

Therefore, what is claimed is:

1. A bloom-inhibited flame retardant composition comprising:
   (a) a thermoplastic polyolefin polymer,
   (b) an effective amount of an organohalide fire retarding agent selected from the group consisting of brominated derivatives of bis(cyclohexenyl) ethylene, and compounds having the structure of a 1:1 Diels-Alder adduct of a halogenated cyclopentadiene and an unsaturated aliphatic or cycloaliphatic halide, and (c) a bloom-inhibitor selected from saturated fatty acids having from about 12 to about 22 carbon atoms and metal salts of said saturated fatty acids.

2. Composition of claim 1 wherein said polyolefin polymer is polypropylene.

3. Composition of claim 1 wherein said bloom inhibitor is present in amounts within the range of about 0.1 to about 5 weight percent of said composition.

4. Composition of claim 1 wherein said bloom inhibitor is stearic acid.

5. Composition of claim 1 wherein said bloom inhibitor is selected from zinc, tin, or aluminum salts of the saturated fatty acid.

6. Composition of claim 5 wherein said bloom inhibitor is a stearate.

7. Composition of claim 1 wherein said bloom inhibitor is aluminum stearate.

8. Composition of claim 1 wherein said bloom inhibitor is stannous stearate.

9. Composition of claim 1 further comprising an antimony oxide synergist.

10. Composition of claim 1 wherein the organohalide fire retarding agent constitutes from about 1 to about 60 wt. percent of the composition and the bloom inhibitor constitutes from about 0.1 to about 5 wt. percent of the composition.

References Cited

UNITED STATES PATENTS

| | | | |
|---|---|---|---|
| 3,403,118 | 9/1968 | Listner | 260—23 |
| 3,418,263 | 12/1968 | Hindersinn et al. | 260—23 |
| 2,985,617 | 5/1961 | Salyer et al. | 260—23 X |
| 2,955,141 | 10/1960 | Schmerling | 260—648 |
| 3,419,518 | 12/1968 | Mahling et al. | 260—45.7 X |
| 3,511,796 | 5/1970 | Wright | 260—648 X |
| 3,591,507 | 7/1971 | Drake et al. | 260—45.7 X |
| 3,238,163 | 3/1966 | O'Neill et al. | 260—23 |

FOREIGN PATENTS

| | | | |
|---|---|---|---|
| 717,127 | 8/1965 | Great Britain | 260—23 |

OTHER REFERENCES

Lyons, "The Chemistry and Uses of Fire Retardants," pp. 293–297 (1970).

DONALD E. CZAJA, Primary Examiner

M. J. WELSH, Assistant Examiner

U.S. Cl. X.R.

260—45.7 R, DIG. 24